(12) United States Patent  (10) Patent No.: US 9,016,854 B2
Guadagnin  (45) Date of Patent: Apr. 28, 2015

(54) MOUNT FOR SPECTACLES

(71) Applicant: Safilo Societa Azionaria Fabbrica Italiana Lavorazione Occhiali S.p.A., Pieve di Cadore (IT)

(72) Inventor: Paolo Guadagnin, Padova (IT)

(73) Assignee: Safilo Societa Azionaria Fabbrica Italiana Lavorazione Occhiali S.p.A., Pieve di Cadore (IT)

( * ) Notice: Subject to any disclaimer, the term of this patent is extended or adjusted under 35 U.S.C. 154(b) by 0 days.

(21) Appl. No.: 14/375,491

(22) PCT Filed: Jan. 29, 2013

(86) PCT No.: PCT/IB2013/050742
§ 371 (c)(1),
(2) Date: Jul. 30, 2014

(87) PCT Pub. No.: WO2013/114269
PCT Pub. Date: Aug. 8, 2013

(65) Prior Publication Data
US 2015/0009472 A1  Jan. 8, 2015

(30) Foreign Application Priority Data
Jan. 30, 2012  (IT) .............................. PD2012A0023

(51) Int. Cl.
*G02C 1/00* (2006.01)
*G02C 1/06* (2006.01)
*G02C 5/00* (2006.01)

(52) U.S. Cl.
CPC . *G02C 1/06* (2013.01); *G02C 5/008* (2013.01)

(58) Field of Classification Search
USPC .................. 351/86, 90, 80, 92–102, 106, 41
See application file for complete search history.

(56) References Cited

U.S. PATENT DOCUMENTS 3,552,840 A * 1/1971 Braget .......................... 351/154
3,589,802 A * 6/1971 Amaru ............................ 351/90

(Continued)

FOREIGN PATENT DOCUMENTS

| DE | 10 2008 020 795 A1 | 10/2009 |
| FR | 1.015.976 | 10/1952 |
| FR | 1.087.341 | 2/1955 |
| FR | 1.380.136 | 11/1964 |
| GB | 1 232 413 | 5/1971 |
| JP | 2006-235481 | 9/2006 |
| WO | WO 00/67067 | 11/2000 |

OTHER PUBLICATIONS

International Search Report and Written Opinion issued in PCT/IB2013/050742 mailed Jul. 2, 2013.
International Preliminary Report on Patentability and Written Opinion issued in PCT/IB2013/050742 dated Aug. 5, 2014.

*Primary Examiner* — Hung Dang
(74) *Attorney, Agent, or Firm* — RatnerPrestia

(57) ABSTRACT

A mount for spectacles includes a first front frame made of plastic and having respective lens-holding rims with a closed contour, to receive and support lens, and a second frame made of metallic material inserted inside the first frame and solidly fixed thereto, the second frame including respective portions in a closed ring shape and extending respectively along the outline of the corresponding lens-holding rim, the mount being produced by stratification of the plastics material of the first frame on the second frame, by applying at least one sheet of plastic material of the first frame on each of the front and rear opposite surfaces of the second frame. At least one section of the second frame, at the location of each lens-holding rim, has a profile extending longitudinally in a sinuous shape, substantially of serpentine configuration, permitting assembly/disassembly of the lens in the lens-holding rim exclusively by resilient deformation.

8 Claims, 2 Drawing Sheets

(56) References Cited

U.S. PATENT DOCUMENTS

| | | | | |
|---|---|---|---|---|
| 4,779,971 A | * | 10/1988 | Lhospice | 351/86 |
| 4,971,431 A | * | 11/1990 | Gerard | 351/86 |
| 5,270,743 A | * | 12/1993 | Hofmair et al. | 351/86 |
| 5,293,185 A | * | 3/1994 | Berger et al. | 351/95 |
| 5,576,777 A | * | 11/1996 | Gioacchini | 351/86 |
| 5,914,767 A | * | 6/1999 | Wedeck et al. | 351/92 |
| 5,992,995 A | * | 11/1999 | Perie | 351/92 |
| 6,015,212 A | * | 1/2000 | Fortini | 351/92 |

* cited by examiner

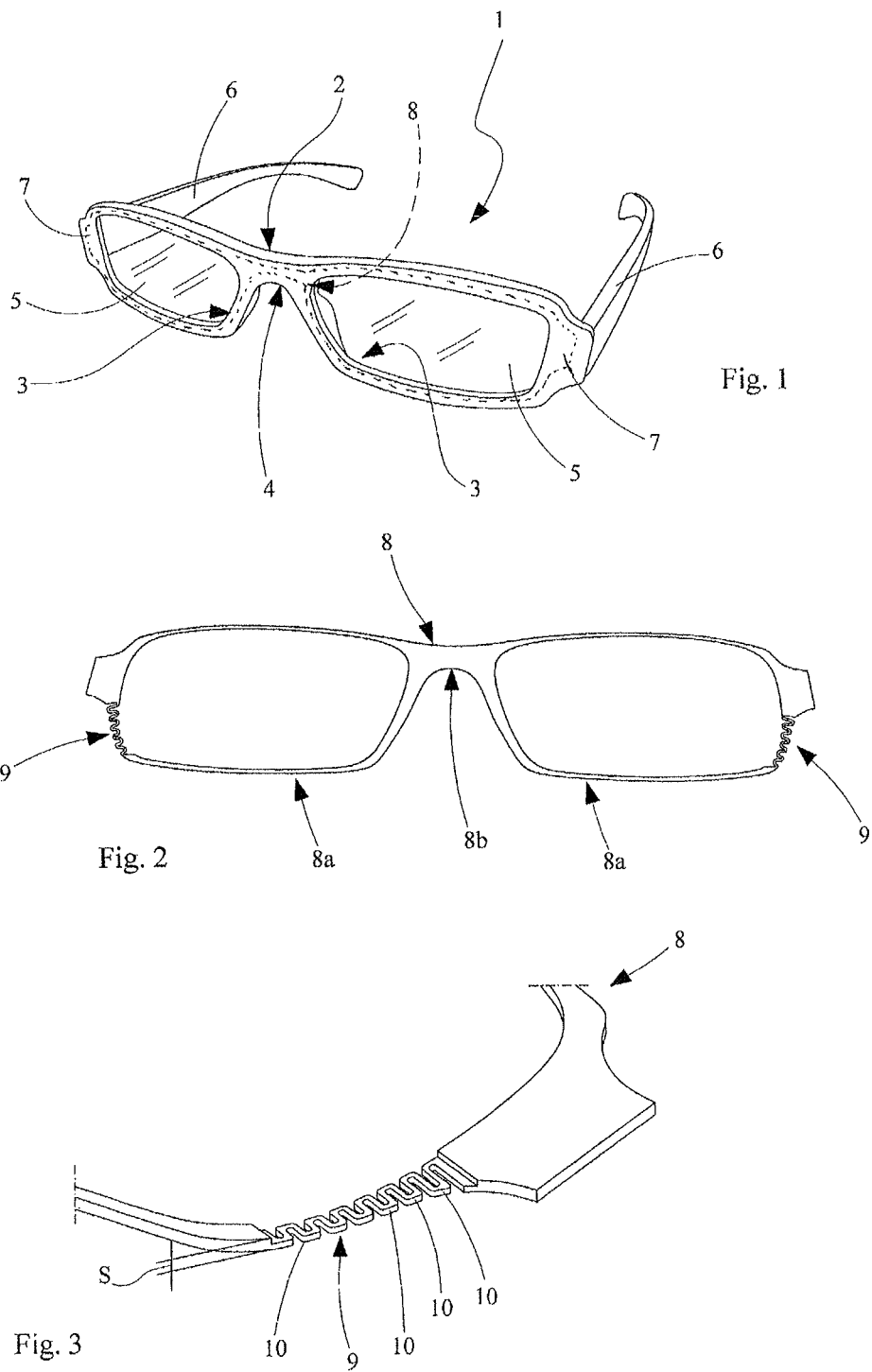

MOUNT FOR SPECTACLES

CROSS REFERENCE TO RELATED APPLICATIONS

This application is the U.S. National Phase Application of PCT/IB2013/050742, filed Jan. 29, 2013, which claims priority to Italian Patent Application No. PD2012A000023, filed Jan. 30, 2012, the contents of such applications being incorporated herein by reference.

TECHNICAL FIELD

The present invention relates to a mount for spectacles.

TECHNOLOGICAL BACKGROUND

The invention relates to the specific field of particularly thin and light mounts for spectacles made from plastics material and having a metal frame inserted completely within the front frame of the mount. Typically, a frame of different material is inserted within the front frame of the mount for ornamental and decorative purposes, in order to seek particular aesthetic effects, which may in particular be obtained by combining the transparency of the plastics material with the possible colours/decorations of the internal metal frame. Moreover, in the case of particularly thin plastics mounts, an internal frame, especially if metallic, is generally needed to make the front frame of the mount robust enough.

Stylistic and dimensional choices (for instance shape, cross-section, thickness) for this type of mount must therefore be such that they do not pose any problem when mounting the lens and are therefore somewhat limited, as will be explained in greater detail below.

For instance, if the front frame is produced using a plastics material which does not tend to soften under the effect of heating, the insertion of the lens should be carried out by means of the same method generally used for front frames of plastics materials which have no internal metal frame, i.e. by resilient deformation of the front frame.

In the case of this particular type of spectacles, it may be that the internal metal frame, even though thin, as it is substantially rigid, greatly reduces the resilient deformability of the front frame, thereby making the mounting of the lens more problematic.

For other types of plastics materials which tend more readily to soften under the effect of heating, the lens may be inserted in the front frame by means of the temporary, more or less localized, softening of the plastics material using an appropriate source of heat (as is generally also the case with mounts with front frames which have no internal metal frame).

The temporary yielding of the material of the front frame (in the parts designed to house the lens) obtained by heating, makes it easier to introduce the lens into its seat in the front frame.

However, in the case, for instance, of cellulose acetate, which is a plastics material used widely in spectacle production and which belongs to the group of materials which more readily soften as a result of heating, the operation to heat a front frame could be detrimental to the integrity of the front frame.

In the case of acetate front frames with very small thicknesses/cross-sections which are, for that reason, particularly appreciated from an aesthetic point of view, the softening of the material by heating, so that the lens may be readily mounted, may in practice be critical, as it may accidentally cause, in the parts of the front frame involved, changes in shape and/or dimensional variations which may be detrimental to the possibility of mounting the lens, or even the general retention of the "design" originally planned for the mount, leading to serious product defects which may well make the product impossible to sell or use.

In the spectacle industry, some plastics materials (often including cellulose acetate itself) are often processed in sheet form. In this case, a front frame of the above-mentioned type may be produced by a method of stratification of the plastics material on a metal frame (i.e. the application of at least one sheet of plastics materials to each of the front and rear surfaces of the frame, the assembly being made rigid by adhesion or like fastening systems). In accordance with this method of manufacture of the mount, the heating may nevertheless cause the problem of "delamination" in the front frame, i.e. the separation of at least one layer of plastics material from the metal frame to which it has previously been fastened, thereby damaging the frame or causing it to become defective.

SUMMARY OF THE INVENTION

The problem to which the present invention relates is that of making available a mount for spectacles of the above-mentioned type, structurally and functionally designed to remedy the problems described with reference to the cited prior art and designed in particular to enable the lens to be mounted in the respective lens-holding rims without causing damage/defects in the mount because of the excessive yielding of the front frame/material subject to heating, making use exclusively of the deformability of the frames in the resilient range.

This problem is resolved by the invention by means of a mount for spectacles of the above-mentioned type embodied in accordance with the appended claims.

In accordance with the features of the invention, the required mechanical and dimensional stability of the overall front frame of the mount is advantageously ensured even during the heating operation prior to the mounting of the lens (when carried out) and at the same time the insertion of the lens is not impeded as a result of the possibility of resilient extension following the temporary deformation of the composite front frame during the insertion of the lens in their seats.

BRIEF DESCRIPTION OF THE DRAWINGS

Other advantages and features of the present invention will become clear from the following detailed description of preferred embodiments thereof, given with reference to the appended drawings which are provided purely by way of non-limiting example and in which:

FIG. 1 is a perspective view of a mount embodied in accordance with the present invention;

FIG. 2 is a partial front elevation of a detail of the mount of FIG. 1;

FIG. 3 is a partial perspective view on an enlarged scale of a detail of FIG. 2;

PREFERRED EMBODIMENTS OF THE INVENTION

Figure 4:
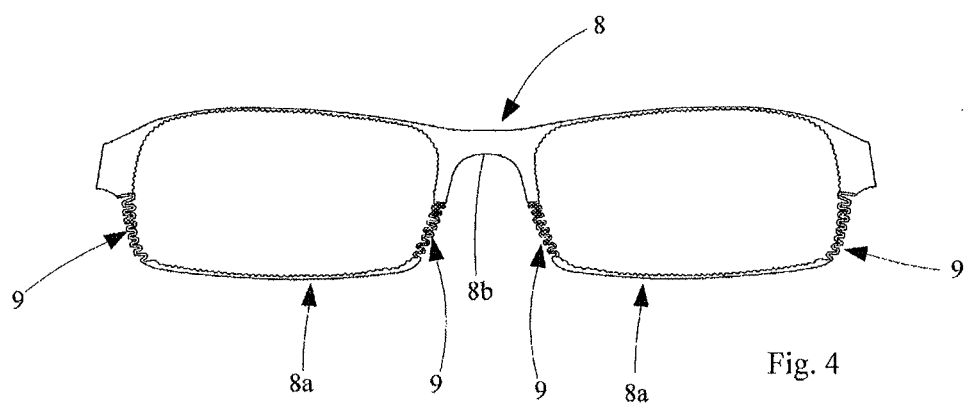
FIG. 4 is a view corresponding to FIG. 2 of a second embodiment of the detail shown.

With reference to the appended drawings, a mount for spectacles embodied in accordance with the present invention is shown overall by 1.

The mount 1 comprises a first main front frame 2, including a pair of respective lens-holding rims 3 with a closed contour connected by a central nasal support zone 4. Each lens-holding rim 3 is designed to receive and support a respective lens 5. Both the lateral temples shown by 6 are articulated on respective end-pieces 7 of the front frame 2.

The mount is of the type comprising a second frame 8 designed to be inserted, at least partially, in the front frame 2 and to be made rigid therewith, the second frame including respective portions shaped as a closed ring, both shown by 8a, extending respectively along the outline of the corresponding lens-holding rim 3. In this embodiment, the frame 8 is to be fully inserted in the front frame 2.

A central bridge connecting the portions 8a is shown by 8b and is designed to be inserted in the front frame 2 at the central nasal support zone 4.

The front frame 2 is preferably of plastics material, for instance cellulose acetate, which is a material typically prepared in sheet form from which the predetermined configurations of the front of the mount are obtained by milling, while the frame 8 is preferably of metallic material, for instance obtained by cutting of metal sheet.

The insertion of the metal frame 8 into the front frame 2 of plastics material makes it possible to obtain particular aesthetic effects, for instance by combining the transparency of the plastics material with the possible colours or decorations of the internal frame 2.

When using cellulose acetate in sheet form, a mount with a front frame 2 of the above-mentioned type may be produced by a method of stratification of the plastics material on the metal frame 8, in which method at least one sheet of cellulose acetate is applied to each of the front and rear surfaces of the frame 8, the assembly being made rigid by adhesion or like fastening systems.

According to a main feature of the invention, the metal frame 8 comprises at least one section 9, on each frame portion 8a, designed to have a high resilient yielding ability in comparison with the resilient behaviour of the remainder of the frame portion 8a. This section 9 has a profile extending longitudinally in a sinuous shape, substantially of serpentine configuration, capable of imparting an ability to yield resiliently, principally in the direction of longitudinal extension and greater than that of the remainder of the portion 8a of the second frame 8.

As a result of the above-mentioned feature, each portion 8a of the metal frame acquires a greater resilience, and can be more readily extended, as well as a greater resilient recall ability. By providing the frame 8 with an adequate degree of resilience or resilient yielding similar to that characteristic of the acetate layers encompassing the metal frame 8, each lens-holding rim 3 acquires a degree of resilience such as to enable the assembly and disassembly of the corresponding lens 5 in the rim 3 solely by resilient deformation thereof.

With particular reference to FIG. 3, the section 9 of each frame portion 8a comprises a plurality of undulations 10 of the respective profile defining a series of bends in the serpentine configuration. This configuration is designed to obtain a kind of "spring" structure in the section 9; in the embodiment shown this spring has bends of a flat configuration. Such a configuration may also be readily obtained by using the technology of photo-etching of metal sheet, by removing the material needed to cause a series of bends in the serpentine section 9. The flat configuration is such that the bends of the serpentine structure are contained within the thickness S of the section 9, which thickness is measured transversely to the direction of longitudinal extension, and have a planar configuration substantially parallel to the front plane of the mount.

It will be appreciated that as a result of the flat serpentine shape described above it is possible advantageously to produce particularly thin and light mounts for spectacles of plastics materials, produced by a method of stratification of the plastics material on a metal frame, of the type to which the present invention specifically relates. Other configurations would not be appropriate for the purposes of the invention. These include, solely by way of example, a conventional spring configuration with helical turns of the type used in many other sectors and applications. In such a configuration, substantially circular and tubular, the internal cavity, defined by the helical turns, has a substantial volume in comparison with the overall bulk of the spring, thus causing the presence of large internal spaces and the resulting drawback that the material of the portions of the front frame is discontinuous which is likely to be detrimental to the robustness of the front frame. Moreover, if using a conventional spring with helical turns, the coupling between the sheets of plastics material of the external frame and such a spring on the internal frame would entail couplings between components having different surface curvatures, obviously leading to a discontinuous stratification of the materials and providing a coupling which is anything but optimal and likely to compromise the stability and the robustness of the mount.

In accordance with the flat and planar serpentine configuration of the frame section 9 of the present invention, the ratio between the total volume of the empty spaces included in the overall bulk of the serpentine configuration, i.e. the spaces enclosed by the bends which define said configuration, and the overall bulk of the serpentine configuration, is substantially lower than the corresponding ratio that may be observed in a traditional spring configuration with helical turns. Moreover, by using the flat serpentine configuration of the present invention, the planar inner surfaces of the sheets of plastics material are in contact with the corresponding outer surfaces of the serpentine configuration which are also planar and of a thickness which may advantageously be equivalent to the remainder of the inner metal frame. In this way, the coupling between sheets of plastics material and the serpentine configuration interposed between them is substantially similar to a coupling between superimposed sheet materials (as is the case for the remainder of the metal frame), i.e. a type of coupling which is particularly effective for the purposes of obtaining a front frame, all of whose components are robust enough.

The serpentine configuration of the present invention has the further advantage that it can be produced in one piece with the inner metal frame, thereby greatly simplifying the processing stages.

The bend structure of the serpentine configuration may also be provided with a thickness which is smaller than the thickness S of the remaining portion 8b. This feature is appropriate when it is wished further to reduce the resilient strength of the frame portion 9, thereby increasing its resilient yielding ability.

In this case, in the front sections corresponding to the resilient section 9 it is easy to obtain a structure with a coupling similar to that between generic superimposed sheet materials, simply by providing a local comparable increase in thickness on one or both plastics sheets in the respective portions coupled with the section 9 of the metal frame, with a view to compensating for the reduced thickness of the metal frame 8 at this section 9.

It will be appreciated, moreover, that the geometry of the serpentine profile described above may be modified or its thickness varied in order to seek the level of resilience of the frame portion 8a most appropriate for the assembly/disassembly of lens solely by resilient deformation of the rims, without making use of any other system of deformation, and in particular without resorting to any operation to heat the mount prior to the assembly of the lens. It should be borne in mind that the heating of a mount of this particular type, in which two frames of cellulose acetate and metal are respectively combined, may be critical for the integrity of the structure as the heating may cause problems of "delamination" in the mount, i.e. the possible separation of one or more of the layers of cellulose acetate from the inner metal frame, on which they were originally secured, thereby causing the mount to be damaged or defective.

It should also be borne in mind that as the heating of a thin plastics front frame may also be counter-productive in the central nasal support zone, it is also possible to provide a spring profile configuration, of the type described above, in the central zone 8b connecting the metal frame portions 8a, at the central nasal support zone 4 of the mount.

Figure 5:
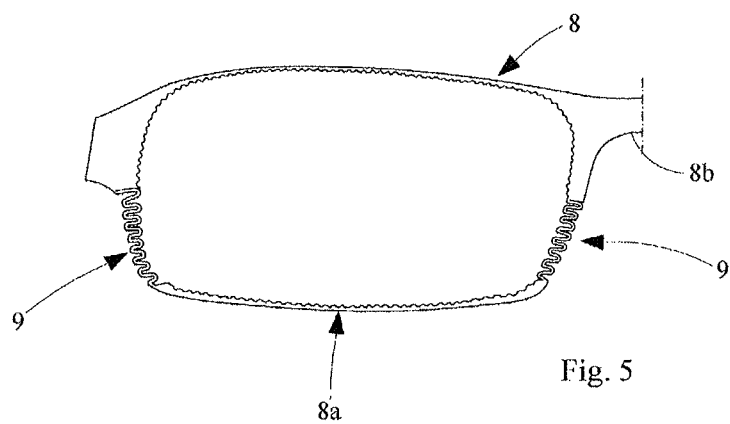
FIG. 5 is a partial view on an enlarged scale of a detail of FIG. 4.

With reference to FIGS. 4 and 5, it is possible to provide, according to the invention, a pair of sections 9, in a serpentine configuration, located at the respective opposing lateral ends of the corresponding lens-holding rim 3.

The invention thus resolves the proposed problem by achieving the above-described advantages with respect to the prior art.

The main advantage is linked to the fact that the mount of the invention also makes it possible readily to mount the lens in front frames of the type described above, using the method of resilient deformation of the front frame, and thus avoiding the operation to heat the front frame of the mount which may well be critical from the point of view of the integrity of the mount. Moreover, if a heating stage is nevertheless appropriate prior to the mounting of the lens, in accordance with the features of the invention, the required mechanical and dimensional stability of the overall front frame of the mount is advantageously ensured even during this heating operation prior to the mounting of the lens (when carried out) and at the same time the insertion of the lens is not impeded as a result of the possibility of resilient extension following the temporary deformation of the composite front frame during the insertion of the lens in their seats.

According to a further advantageous aspect of the invention, in the mount of the present invention, as a result of the stratified configuration of the internal and external frames, made rigid with one another, the serpentine section, designed to provide localized resilient yielding which is greater than in the remainder of the frame, is provided in the internal metal frame, separately from the profile of the external frame in whose peripheral contour the seats for housing and retaining the lens are provided, the perimetral contours of these seats thus remaining continuous and such as not to generate any interruption or discontinuity in the coupling between the lens-holding rim and the lens, thus ensuring a stable and precise contact of the lens along the whole perimetral ring of the corresponding rim.

This feature is particularly important in mounts of the type of the present invention, which are particularly thin and light and are produced by a method of stratification of the plastics material on a metal frame, made rigid with one another, in which as a result of the provision of a serpentine section, in particular of flat planar configuration, on the internal metal frame of the mount designed to be incorporated in the stratified structure of the external frame of plastics material, the mount is provided with adequate strength, although thin and light, and at the same time the lens-holding rims are provided with adequate resilient yielding to enable the assembly/disassembly of the lens in their respective rim solely by resilient deformation of the rim.

The invention claimed is:

1. A mount for spectacles comprising
   a first front frame made of a plastic material and having respective lens-holding rims with a closed contour, designed to receive and support respective lens,
   a second frame made of a metallic material inserted inside the first frame and solidly fixed thereto, said second frame including respective portions in the shape of a closed ring and extending respectively along an outline of the corresponding lens-holding rim, the mount being produced by stratification of the plastic material of the first frame on the second frame, by applying at least one sheet of plastic material of the first frame on each of the opposing front and rear surfaces of the second frame, the assembly obtained being made rigid, wherein at least one section of the second frame, at the location of each lens-holding rim, has a profile extending longitudinally in a sinuous shape, substantially of serpentine configuration, capable of imparting to said at least one section of the second frame an ability to yield resiliently, principally in a direction of longitudinal extension and greater than that of the remainder of the portion of the second frame, so as to permit the assembly/disassembly of the lens in the respective lens-holding rim exclusively by resilient deformation of said rim.

2. A mount according to claim 1, wherein the at least one section of the second frame (8) comprises a plurality of undulations of the respective profile defining a series of respective bends in the serpentine configuration of said section.

3. A mount according to claim 2, wherein the series of undulations is flattened in a planar configuration, substantially parallel to the frontal plane of the mount.

4. A mount according to claim 2, wherein the series of bends defining the serpentine shape is contained within the thickness of said section of the second frame, the thickness being measured transversely to the direction of longitudinal extension of the second frame section.

5. A mount according to claim 1, wherein the serpentine configuration of the section of the second frame is obtained by shearing a metal plate with which the second frame is produced.

6. A mount according to claim 5, wherein the serpentine configuration of said section is obtained in the second frame by photo-etching.

7. A mount according to claim 1, wherein on each lens-holding rim there are provided at least two sections in a serpentine configuration which are provided in the second frame and located at the respective opposite lateral ends of the corresponding lens-holding rim.

8. A mount according to claim 1, comprising, in the second frame, a central connecting region of said portions, extending at a central nasal support region of connection between the lens-holding rims of the mount, said at least one section of the second frame, with increased resilient yielding ability, extending at said central connecting region of the portions.

* * * * *